June 17, 1930.　　　G. J. MULLER　　　1,764,740
STEAM GENERATING APPARATUS
Filed April 11, 1927
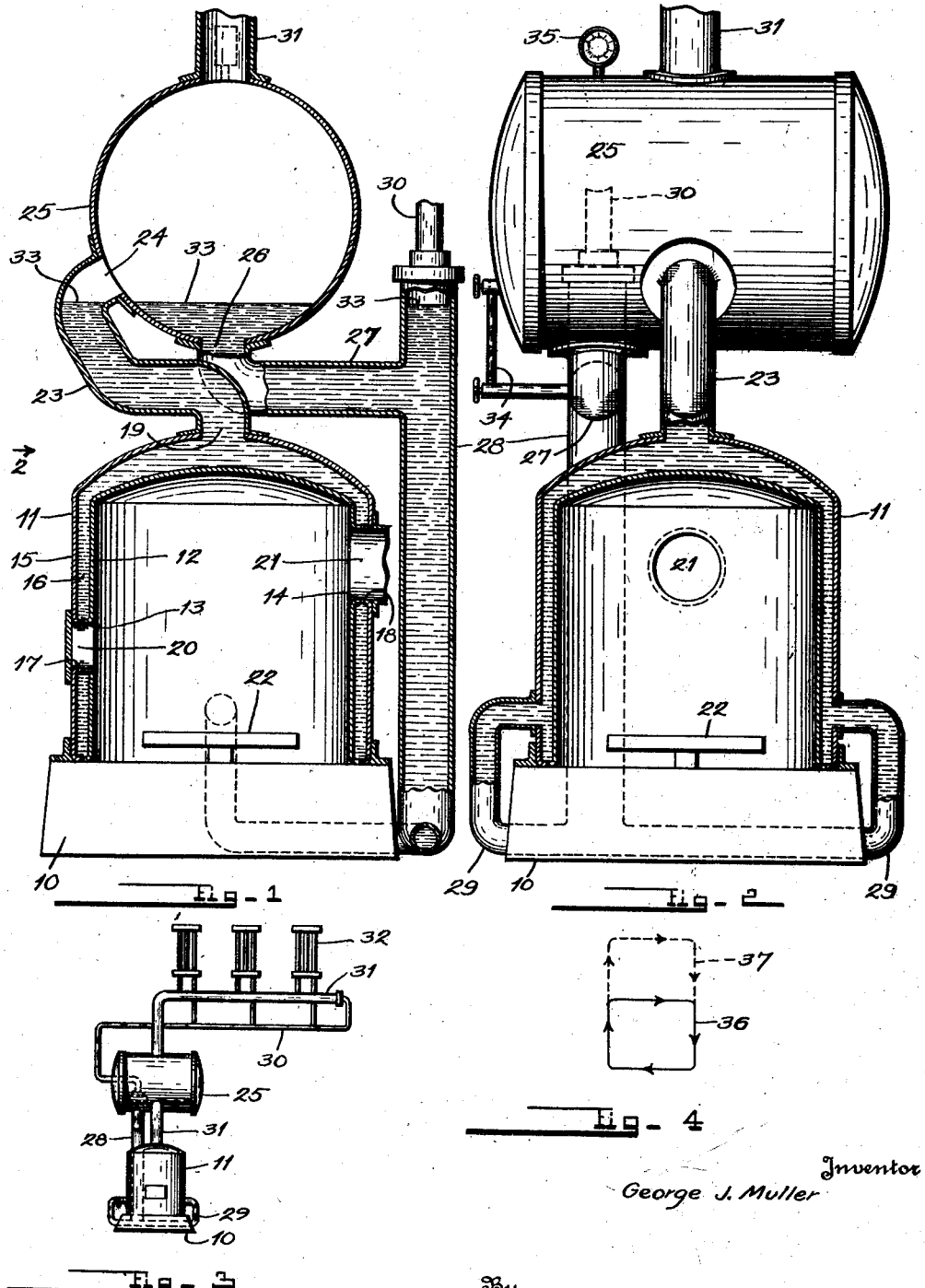
Inventor
George J. Muller
By John W. Darley
　　Attorney Patented June 17, 1930

1,764,740

UNITED STATES PATENT OFFICE

GEORGE J. MULLER, OF BALTIMORE, MARYLAND, ASSIGNOR TO THE HOME HEATING CORPORATION, OF BALTIMORE, MARYLAND, A CORPORATION OF MARYLAND

STEAM-GENERATING APPARATUS

Application filed April 11, 1927. Serial No. 182,863.

My invention relates to steam generating apparatus.

The principal object of my invention is to devise a steam generating apparatus for use, more particularly, in systems of the closed steam type as more commonly used in domestic heating installations, which is characterized by a great reduction in the amount of water necessary for vaporization and accordingly a marked economy in the quantity of heat required for steam generation purposes.

A further object is to devise an apparatus as above described in which the generator, or boiler, feed water is maintained at a higher temperature than now obtains in the art, through a dual and separate circulation of the contained water and steam, in the apparatus and external system, respectively, thereby securing further economies in the matter of heat transfer and a quicker responsiveness to the load demands of the system.

A further object is to devise a steam generating apparatus which is characterized by a collection of the steam over a relatively quiet water surface, thereby improving the quality of the steam generated and absolutely preventing the phenomena of priming with its attendant waste of heat.

A further object is to devise a steam generating apparatus which is so constructed as to decrease heat absorptive losses, to secure a general improvement in design, and to effect a reduction in the cost of building and operation.

Steam heating plants of the closed system type as now known provide for a single cycle of the working fluid, i. e., conversion of water into steam in the boiler, passage of the steam through the heating system, and finally return of the steam as condensate to the boiler. The path traveled is rather long and the time element involved is such that assurance can not be had that a unit volume of steam, or its water equivalent, will be returned to the boiler as condensate synchronously with, or within a reasonable time after, the production of a unit volume of steam at the steaming surface of the water. However, the water level in the boiler must be maintained above a minimum point in order to prevent burning of the heated surfaces, regardless of wide and sudden variations in the load conditions. As a result of the above situation, boilers of the character under discussion necessarily operate with a large water factor of safety, requiring an amount of water which is greatly in excess of the maximum demand of the system.

Several disadvantages flow from the foregoing scheme of operation. In the first place, the temperature of the excess water must be raised to the boiling point, which requires energy beyond that absolutely necessary for generating steam sufficient to meet the system demands and is accordingly wasteful of fuel. Again, the generator is obviously of a relatively heavy construction in order to properly confine the large amount of water, thus creating further heat losses through metallic absorption. Moreover the steam enters the system directly after leaving the steaming surface of the water, which is in a state of agitation, and will therefore entrain particles of moisture, a condition which lessens the steam's value as a heat carrying agent. In addition, under a sudden load change, the present systems are characterized by relatively slow steaming abilities owing to the necessity for heating the excess water. A further loss of heat occurs by reason of the relatively low temperature at which the condensate returns to the boiler as feed water, since the latter must again be raised to the boiling point.

In view of the foregoing operative losses, inherent in present equipment, I have devised the arrangement embodied in this application. Essentially, it provides for a dual circulating arrangement of the water and steam in the apparatus and exterior system, respectively, the circulation of the former being controlled so that the volume subjected to heat at any instant is considerably less than the total water volume, or in other words, the water is not heated in mass. Heat transfer is therefore improved and fuel consumption lessened. The steam generator proper is supplied water by the action of a water tender which is continually replenished through the water circulation established by the generator. Hence, it is immaterial, regardless of operative conditions and provided that the condensed steam be returned at some time, whether the return of condensate be continuous or not, since the heated surfaces of the boiler are always covered primarily by the water from the tender, plus such condensate as returns from time to time. By this circulating arrangement, it has been ascertained that a considerable reduction in the volume of water required is effected, with manifest advantages.

As discussed above, the flow of boiler feed water in present closed systems is dependent solely upon the condensate, but in my improved arrangment, the condensate serves merely as an auxiliary feed. It follows, therefore, that the feed water will contain a higher heat of the liquid, since the larger proportion thereof is continually subjected to heat in the boiler, and it will accordingly require less heat to raise the feed water to the boiling point and to evaporate the same than is now common in the art. Moreover, under this plan of operation, quick responsiveness to load demands is assured, without a dangerous lowering of the water line in the boiler.

The above enumerated advantages are all realized by, and my invention resides in, a low pressure steam generator comprising a water heater, a steam disengaging chamber located at a level above said water heater and at a point removed therefrom, a conduit leading from said heater at its highest point to said disengaging chamber at a point materially above the bottom thereof, a second conduit leading from substantially the bottom of said disengaging chamber to the lower portion of said heater, a steam off-take from the upper portion of said disengaging chamber, and a condensate return conduit communicating with the lower portion of said heater, for instance, by tapping said return conduit into said second conduit at any convenient point. With this organization of parts, and with the system supplied with water to a level which maintains some water in the bottom of the disengaging chamber, for instance, by purging or ebullition from the heater, but with the water level in the disengaging chamber preferably somewhat below the point at which the conduit from the heater enters the disengaging chamber, the lower portion of the disengaging chamber, together with the aforesaid second conduit which leads from the disengaging chamber to the lower portion of the heater, constitutes the water tender before referred to and maintains the circulation between the heater and the disengaging chamber necessary to keep the disengaging chamber supplied with water at steaming temperature.

It will be understood that while my apparatus is intended primarily for use in connection with a closed system, nevertheless its capacity for operating with a low water content, free from the objection of priming or any danger of driving the water out of the generator, can be readily employed in other types of systems. These advantages are due to two important features of my construction, namely, that the aparatus comprises two communicating water lines, or surfaces, from one of which the steam is liberated with the usual agitation and over the other of which, the same being relatively quiet, the liberated steam is collected prior to entering the external system, and also that any tendency to drive the water from the generator portion of the apparatus results only in a discharge into the feed water container, or water tender, from which it is immediately delivered to the generator. The latter is therefore supplied with water at all times.

These and further objects of my invention will be set forth in the following specification, reference being had to the accompanying drawing, and the novel means by which said objects are effectuated will be definitely pointed out in the claim.

In the drawing:

Fig. 1 is a sectional side elevation of my improved steam generating apparatus.

Fig. 2 is a view, partly in section looking in the direction of the arrow 2 in Fig. 1.

Fig. 3 is a diagrammatic representation of a closed generating system using my improved apparatus.

Fig. 4 shows diagrammatically the paths followed by the circulation cycles in the system shown in Fig. 3.

In the drawing:

The numeral 10 represents a base upon which rests a water heater 11. Said heater comprises an inner shell 12 which is flanged outwardly as at 13 and 14 to define openings and an outer shell 15 which forms with said inner shell a water space 16. Said outer shell is flanged inwardly as at 17 and 18 to form openings which are aligned with the openings formed by the flanges 13 and 14, respectively. The opening defined by the flanges 13 and 17 may be regarded as the ordinary fire door opening 20, while that defined by the flanges 14 and 18 may be regarded as a flue passage 21. The foregoing manner of constructing the generator 11 is intended as merely representing one form, the essential requirement being that the inner shell 12, which encloses the combustion chamber, shall be surrounded by a water space of convenient volume.

Located in the shell 12 is a device 22 which represents generically any source of heat that may be found suitable for use in the heater and may comprise a coal fired grate, different forms of fluid burners, such as oil and gas, or electric heaters. The character of heat source does not form any part of my invention and has therefore not been particularly illustrated or described.

An opening 19 is provided at substantially the highest point of the shell 15 and a pipe 23 connects said opening with an opening 24 provided in a container 25, which is preferably disposed at a higher elevation than the heater 11. An opening 26 is provided in the bottom of said container and one end of a pipe 27 is connected therewith, the opposite end of said pipe being in communication with a standpipe 28 which is disposed adjacent the heater 11. As shown in Fig. 1, the opening 24 is placed in the side of the container 25 at some predetermined distance above the bottom thereof for a purpose hereinafter explained.

The lower end of the standpipe 28 is bifurcated to form the branches 29—29, the ends of which are in communication with the water space 16 adjacent the bottom thereof. The opposite end of the pipe 28 is connected to one end of a return line 30 the opposite end of which is in communication with one end of a steam offtake or line 31 which leads from the container 25. Suitable radiators 32 may be connected to the lines 30 and 31 in the usual manner. The radiators 32 are intended to be representative of any load to be used in connection with my apparatus and hence I do not care to be restricted merely to the use of such devices, as the essence of my invention resides in the production of steam in the manner hereinafter described. Moreover, the two pipe arrangement with which the radiators 32 are shown as connected in Fig. 3 is not to be regarded as restrictive in its nature, as the ordinary one pipe construction may be adopted without affecting the operation of the system.

The unit as shown in Fig. 1 is charged with water in any desired manner until the level attains some height such as 33, in which the level of the water in the container 25 will be below the opening 24. A suitable water glass 34 may be mounted in an appropriate location on the unit to determine this condition and the usual steam gage 35 may be secured on the container 25. The operation of my improved apparatus is as follows:

Heat is generated by the device 22 in any desired manner and this heat is communicated to the water in the space 16 through the shell 12. The heated water expands, rises in the pipe 23 until it pours, purges or boils through the opening 24 into the container 25. The water level then recedes approximately to the point shown in Fig. 1 until sufficient heat has again been absorbed by the water in the space 16. It will be apparent that the water which passes through the opening 24 into the container 25 is immediately replaced by water flowing from said container through the pipes 27, 28 and 29 into the water space 16. The circulation of water thus established by the absorption of heat is represented graphically by the full line 36 in Fig. 4, the circulation being clockwise as represented by the arrows in said figure. During this functioning, it will be apparent that the steam disengaging chamber or container 25 and return pipe 27 operate as a water tender for the steam generator 11, the water level in said container determining the water level for the entire unit.

The foregoing manner of circulation continues under the addition of more heat from the source 22 until the temperature of the water attains the boiling point. Steam bubbles are then formed on the exterior of the shell 12, and, rising through the water space 16 and pipe 23, cause water to be discharged through the opening 24 into the disengaging container 25. Steam alone does not enter the container 25, since the agitation engendered by the passage of the bubbles through the space 16 and pipe 23, together with the rise and fall of the water created by the absorption of heat, causes a projection of water at steaming temperature into said container. The water immediately falls to the bottom of the container, there forms a disengaging surface and the steam is collected in the upper portion of the container from which it may flow to such duty as may be receiving steam from the apparatus.

The steam circulation is represented graphically by the dotted line 37 in Fig. 4, the direction of flow being indicated by the arrows. The flow relation of the water and steam is also shown clearly in said figure, from which it will be obvious that under operating conditions, the circulation of water moves essentially along a closed path and at one portion thereof, steam is extracted, permitted to pass through the system and is then returned as condensate to the closed water path at another point thereof to resume the cycle.

It will now be understood that, coincident with the forcing of water at steaming temperature into the container 25, the water equivalent thereof is immediately replaced through the flow of water from said container back to the heater. The essential difference between this mode of operation and those heretofore known in the art resides in the fact that primary dependence is not placed upon a return of condensate for a feed water supply, but the latter is obtained from a water tender which is relatively close to and causes water to move continually through the heater 11. From this construction flow certain important advantages. Not only has it been ascertained that considerably less water is required through water and steam circulations established in the above manner, but the apparatus is characterized by a quicker responsiveness to sudden demands of the load for steam and also by economy in heat transfer. These results follow from the relatively small volume of water which is being heated at any given instant and from the fact that the major portion of the feed water is obtained from the disengaging container 25, which always contains steam during operation.

In addition to serving as a water tender for the generator 11, the container 25 also operates as a steam dome, facilitating the separation of water from steam therein and the delivery of approximately dry steam to the system. In contrast with present installations, the steam is collected in the container 25 over a water surface which is relatively quiet, rather than in a state of ebullition which would be favorable for the production of wet steam and frequently of priming with a resultant waste of heat. The steam space in said container will in general be larger than the water space, so that it will act as a steam reservoir that will maintain a substantially uniform pressure. It has been found that my apparatus will operate most efficiently at pressures not above one atmosphere gauge.

A further advantage of my improved apparatus follows from the fact, that, since the water content of the heater 11 is always maintained constant, steam may be raised rapidly without endangering any portion of the heated surfaces of the boiler, a characteristic which is desirable in systems that are subjected to sudden fluctuations in demand.

While I have shown one set of elements and combinations thereof for effectuating my improved apparatus, it is to be understood that the same are for the purpose of illustration only and in nowise to restrict my device to the exact forms and structures shown, for many changes may be made therein without departing from the spirit of my invention.

I claim:

A low pressure steam generator comprising a water heater, a steam disengaging chamber located at a level above said heater and at a point removed therefrom, a conduit leading from said heater at its highest point to said chamber at a point materially above the bottom thereof, and a second conduit leading from substantially the bottom of said chamber to the lower portion of said heater, a steam offtake from the upper portion of said chamber, and a condensate return communicating with the lower portion of said heater.

In testimony whereof, I affix my signature.

GEORGE J. MULLER.